W. A. KINNEY.
AUTOMOBILE HEATER.
APPLICATION FILED APR. 1, 1920.

1,421,255.

Patented June 27, 1922.
2 SHEETS—SHEET 1.

Inventor
William A. Kinney
By W.W.Williamson
Atty.

W. A. KINNEY.
AUTOMOBILE HEATER.
APPLICATION FILED APR. 1, 1920.

1,421,255.

Patented June 27, 1922.
2 SHEETS—SHEET 2.

Inventor
William A. Kinney
By W. W. Williamson
Atty

UNITED STATES PATENT OFFICE.

WILLIAM A. KINNEY, OF PHILADELPHIA, PENNSYLVANIA.

AUTOMOBILE HEATER.

1,421,255.  Specification of Letters Patent.  Patented June 27, 1922.

Application filed April 1, 1920. Serial No. 370,430.

*To all whom it may concern:*

Be it known that I, WILLIAM A. KINNEY, a citizen of the United States, residing at Philadelphia, in the county of Philadelphia and State of Pennsylvania, have invented new and useful Improvements in Automobile Heaters, of which the following is a specification.

My invention relates to a new and useful improvement in automobile heaters, and has for its object to provide an exceedingly simple and effective device of this description for heating the interior of automobiles by the exhaust from the motor.

A further object of my invention is to provide for the proper distribution of the exhaust gases so as to utilize the heat therefrom in the most effective manner.

A still further object of my invention is to provide for the proper circulation and heating of the air in its passage to the interior of the automobile.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figure 1:
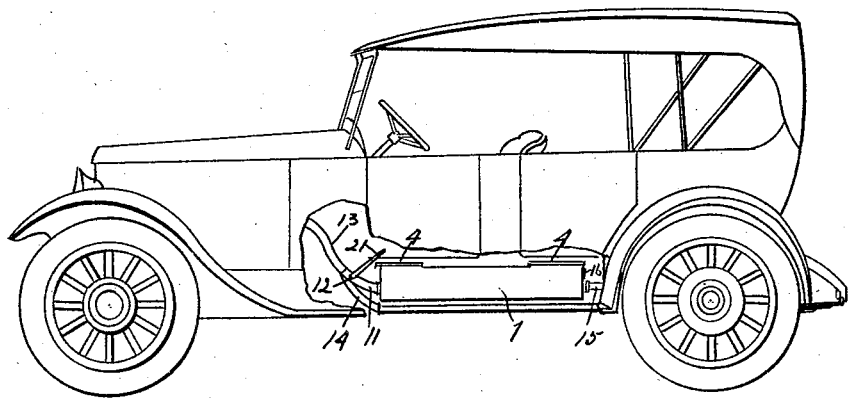
Fig. 1, is a side elevation of an automobile having my improved heater applied thereto, a portion of the body of the machine being broken away to clearly show the location of the heater.
Figure 2:
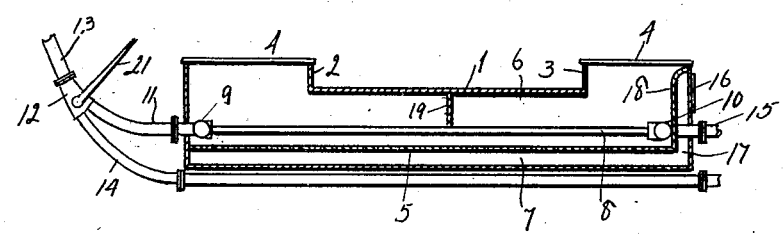
Fig. 2, is a central longitudinal section of the heater.
Figure 3:
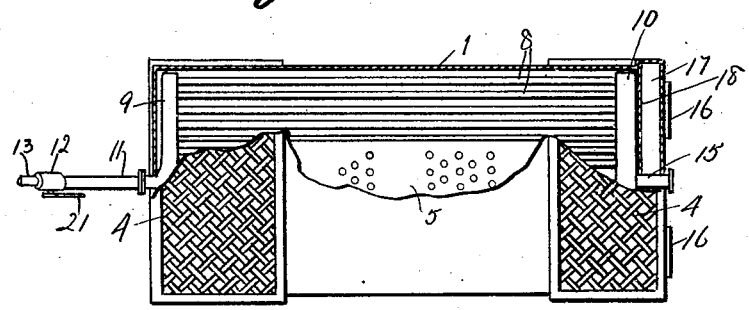
Fig. 3, is a plan view of the heater partly broken away to show the arrangement of the heating tubes therein.
Figure 4:
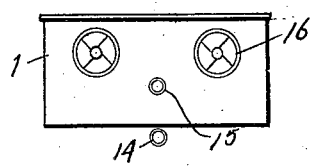
Fig. 4, is a rear view of the heater.
Figure 5:
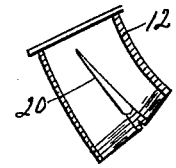
Fig. 5, is an enlarged section of the 2-way valve for directing the flow of the exhaust.

In carrying out my invention as here embodied, 1 represents the casing of the heater provided with the flues 2 and 3, the openings from said flues being covered by the grates 4 so as to permit the air to freely flow from the casing to the interior of the automobile. The casing is secured to the underside of the body of the machine in such manner that the flue 2 communicates with the front compartment while the flue 3 communicates with the back compartment thereof after the manner of a hot air register.

Within the casing is located a horizontal perforated plate 5 dividing the interior of said casing into an upper compartment 6 and a lower compartment 7, and just above this perforated plate are located a number of tubes 8 the front ends of which are connected with the manifold 9, while the rear ends thereof are connected with the manifold 10, said manifolds extending crosswise of the casing near the ends thereof.

To the manifold 9 leads an inlet pipe 11 the opposite end of which is connected with one branch of the 2-way valve 12, and this 2-way valve in turn is connected with the main exhaust pipe 13 leading from the motor. Also connected with one branch of the 2-way valve is the exhaust pipe 14 which passes backward beneath the casing its rear end leading to the open air or to a suitable muffler. A pipe 15 leads rearward through the rear wall of the casing from the manifold 10 and may terminate either in the open air or in a muffler.

Through the rear wall of the casing are formed suitable openings over which are fitted the valve discs 16, said discs being so pivoted as to be readily turned for increasing or decreasing the inflow of air to the casing, said openings leading to the passageway 17 formed between the rear wall of the casing and the partition 18 which latter is located just back of the manifold 10, said passageway communicating with the compartment 7 beneath the perforated plate 5. The compartment 6 is partially divided by a baffle plate 19 for directing the flow of the heated air to the flues.

From the foregoing description the operation of my improved heater will be obviously as follows:

The flap valve 20 of the 2-way valve being set through the medium of the operating lever 21 to a position which will close the outlet of the exhaust gases through the pipe 14 will cause said gases to pass through the pipe 11 to the manifold 9. These gases will flow through the tubes 8 to the manifold 10 and then through the pipe 15 to the muffler. The tubes 8 being heated by said gases will raise the temperature of the air within the casing and cause it to flow upward within the flues 2 and 3 to the interior of the automobile which in turn will cause an inflow of air through the valves 16 (said valves having previously been opened for that purpose) and this inflowing air will pass downward through the passageway 17 to the compartment 7 where it will be distributed beneath the perforated plate 5. As the air passes through the perforations of said plate it will be divided into fine streams which will contact with the tubes 8 and be heated by said tubes causing it to flow upwardly through the flues 2 and 3 thus effectively heating the interior of the automobile.

The degree to which the air flowing into the casing is heated is regulated by the proper manipulation of the 2-way valve so as to direct more or less of the exhaust gases to the tubes within the casing, and a further regulation of the heat entering the interior of the automobile may be accomplished by regulating the relative amount of air flowing into the casing through the valves 16 by the proper adjustment of said valves as will be readily understood.

I have found by experiment and in practice that the baffle 19 within the upper compartment greatly facilitates the proper flow of heated air to the two compartments of the automobile since it prevents an excess of heated air flowing to one compartment at the expense of the other compartment.

The shutting off of the action of the heater is readily accomplished by manipulating the 2-way valve 12 so as to close the passage of the exhaust gases through the tubes 8 forcing all of said gases to pass through the pipe 14 to the muffler.

Of course I do not wish to be limited to the exact details of construction as herein shown as these may be varied within the limits of the appended claim without departing from the spirit of my invention.

Having thus fully described my invention, what I claim as new and useful is:—

An automobile heater comprising a casing having a flue at each end and provided with damper controlled air inlets at one end, a perforated plate dividing the interior of said casing into upper and lower compartments, a plurality of tubes within the upper compartment adapted to be connected with the exhaust of an engine, a partition to the rear of said tubes and forming with the walls of the casing a passageway leading from the air inlets to the lower compartment and means in the upper compartment to direct the flow of air to the flues.

In testimony whereof, I have hereunto affixed my signature.

WM. A. KINNEY.